United States Patent [19]
Perry

[11] Patent Number: 5,511,052
[45] Date of Patent: Apr. 23, 1996

[54] DIGITAL COMPENSATOR FOR CONTROLLING A SERVO TO CORRECT THE VALUE OF A GIVEN PARAMETER OF A SYSTEM

[75] Inventor: Stuart D. Perry, Rochester, N.Y.

[73] Assignee: Eastman Kodak Company, Rochester, N.Y.

[21] Appl. No.: 228,918

[22] Filed: Apr. 18, 1994

Related U.S. Application Data

[63] Continuation of Ser. No. 880,778, May 11, 1992, abandoned.

[51] Int. Cl.$^6$ .................................................. G11B 7/085
[52] U.S. Cl. .......................... 369/44.34; 369/54; 318/632
[58] Field of Search .............................. 369/44.34, 124, 369/44.35, 44.41, 44.29, 44.28, 54, 44.26, 44.13, 50, 51; 350/201.5; 360/71, 73.03, 73.04, 73.09, 77.01, 77.02, 77.05, 77.06, 77.07, 78.04, 78.01; 318/632, 561, 569, 600

[56] References Cited

U.S. PATENT DOCUMENTS

| | | | |
|---|---|---|---|
| 4,050,065 | 9/1977 | Mesley | 340/347 NT |
| 4,669,074 | 5/1987 | Hsieh et al. | 369/45 |
| 4,710,909 | 12/1987 | Tsuyoshi et al. | 369/44.34 |
| 4,751,695 | 6/1988 | Kaku et al. | 369/44.34 |
| 4,785,442 | 11/1988 | Ohtake et al. | 369/44.34 |
| 4,795,958 | 1/1989 | Nakamura et al. | 369/44.34 |
| 4,853,839 | 8/1989 | Nichols | 364/167.01 |
| 4,888,757 | 12/1989 | Fujita | 369/44.34 |
| 4,901,077 | 2/1990 | Christopher | 341/143 |
| 5,157,642 | 10/1992 | Tsukamura et al. | 369/44.34 |

FOREIGN PATENT DOCUMENTS 0298931  12/1987  Japan ................................. 369/44.34

*Primary Examiner*—Aristotelis Psitos
*Assistant Examiner*—Thang V. Tran
*Attorney, Agent, or Firm*—Raymond L. Owens

[57] ABSTRACT

A digital compensator controls a servomechanism, such as the focus servo of an optical disk drive. The compensator waits one full sample period before applying the correction that was calculated for the proceeding sample. The compensator does not use the present input sample in its calculation of the present output sample. The method for operating the digital compensator comprises the steps of receiving a first input sample at time $t_1$, receiving a second input sample at time $t_2$, and computing a first output in response to the first input sample at time $t_2$. The method does not require a present input sample to calculate a present output.

15 Claims, 5 Drawing Sheets

DIGITAL COMPENSATOR FOR CONTROLLING A SERVO TO CORRECT THE VALUE OF A GIVEN PARAMETER OF A SYSTEM

This is a Continuation of application U.S. Ser. No. 880,778 filed 11 May 1992 now abandoned.

TECHNICAL FIELD OF THE INVENTION

This invention pertains generally to digital filters, and, more particularly, to a digital compensator which compensates for the behavior of transducers. Such a digital compensator is useful in a digital controller for controlling the focus servo, for example, in an optical disk drive.

BACKGROUND OF THE INVENTION

In digital control algorithm development, the design and performance of digital controllers is typically driven by degradation of system response as function of delay time (or sample acquire and computation time) and the cost of the hardware used in implementing the algorithm. Delay time degradation of system response results in oscillatory or unstable systems as the delay time approaches the sample period for the compensator. Typically, the ideal delay is desired to be somewhat less than half the sample period. As a rule of thumb, very good results can be obtained with digital compensator implementations whose delay time is less than ⅕ of the sample period. Typically, compensator design methods use the present input sample in calculating the present output sample. Because acquire and calculation time is finite and nonzero, there is a problem. The problem is that the system response when using these techniques deviates from the ideal case of zero delay time and degrades with delay time. It is therefore desirable to have a digital compensator that provides the ideal case of zero delay time.

Hardware cost is related to delay time because as controller demands increase, so do the deleterious effects of the delay time. By using a faster, and therefore more expensive, processor, the delay time to sample time ratio can be decreased below the ⅕ rule of thumb. The cost of the analog-to-digital and digital-to-analog converters required for the digital compensator implementation is also a factor to be considered. Generally, these devices have delay times (acquire and settling time) associated with them which can be decreased by purchasing more expensive devices.

Accordingly, it will be appreciated that it would be highly desirable to have a digital compensator that provides ideal or nearly ideal system response with inexpensive processors and converters.

SUMMARY OF THE INVENTION

The present invention is directed to overcoming one or more of the problems set forth above. Briefly summarized, according to one aspect of the present invention, a method for operating a digital compensator comprises the step of receiving a first input sample at time $t_1$, receiving a second input sample at time $t_2$, and computing a first output in response to the first input sample in a manner that provides an output at time $t_2$. The method does not require a present input sample to calculate a present output. The present output uses a past input so that there is no delay time due to acquire and computation time.

According to another aspect of the invention, a digital compensator for controlling a servo to position a member comprises means for receiving a first input sample at time $t_1$ representative of the position of the member at time $t_1$, means for receiving a second input sample at time $t_2$ representative of the position of the member at time $t_2$, means for computing a first output in response to the first input sample at time $t_2$, and means for delivering the first output to the servo to reposition the member.

A feature of the present invention is waiting one full sample period before applying the correction that was calculated for the preceding sample. The problem of waiting one sample period to output the computation is a major problem in terms of the response of the system. Oscillatory behavior occurs with a conventional compensator design when the delay time approaches (or exceeds) ⅕ the sampling period. In the control systems, the sample period is almost universally taken to be one tenth the speed of response of the final servo. So, for example, if there is a servo with a 2 kilohertz bandwidth, the sample period is chosen to be 1 over 2 kilohertz divided by 10 yielding 50 microseconds. What this means is that, instead of calculating the output exactly at a time t equal to zero, calculate the output at t plus 50 microseconds. This allows a full sampling period (50 µs) to complete the input acquisition and output computation. With the present invention, at the nominal system gain (k=1), a well conditioned response occurs in sharp contrast to the conventional compensator where even a 10 µs delay in the output causes an oscillatory response.

What is new and counter to conventional compensator design is understanding that there will be a delay in the output and designing the compensator to delay the output. What is done is to determine how long the output will be delayed, then calculate filter parameters based on the delay.

According to another aspect of the invention, an optical disk drive comprises a focus servo, and digital filter means for controlling the focus servo. The optical disk drive includes means for acquiring a first input sample, means for receiving the first input sample at time $t_1$ representative of the status of said servo at time $t_1$, means for acquiring a second input sample, and means for receiving the second input sample at time $t_2$ representative of the status of said servo at time $t_2$. The optical disk drive also includes means for computing a first output in response to the first input sample at time $t_3$, where $t_3$ is equal to $t_1$ plus the time required to acquire said first input sample plus the time required to compute said first output, and means for delivering the first output to the focus servo to affect focus of the optical disk drive. Note that $t_3$ does not need to be coincident with the sampling time. Because the acquire plus computation time is fixed, namely $(t_3-t_1)$, the new compensator is designed to delay the output by $(t_3-t_1)$.

If the disk speed increases or decreases, the sample time may vary. If samples come faster, for instance, that could present problems to a conventional compensator because the delay time (which will be fixed due to fixed computation and acquire time) will be constant but the sample period will decrease. This increases the ratio of delay time to sample period and results in oscillatory behavior. Assuming that the servo can sample at a different rate, the design of the compensator remains the same. Because the compensator is designed to delay the output by 1 sample period without response degradation, the ratio of delay to sample period remains the same. Therefore system response does not change.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 is a graph illustrating the effect of delay time on a conventionally designed digital PID compensator wherein there is undershoot and overshoot of the response signal prior to approaching the desired steady state.

DETAILED DESCRIPTION OF THE PREFERRED EMBODIMENTS

Figure 1:
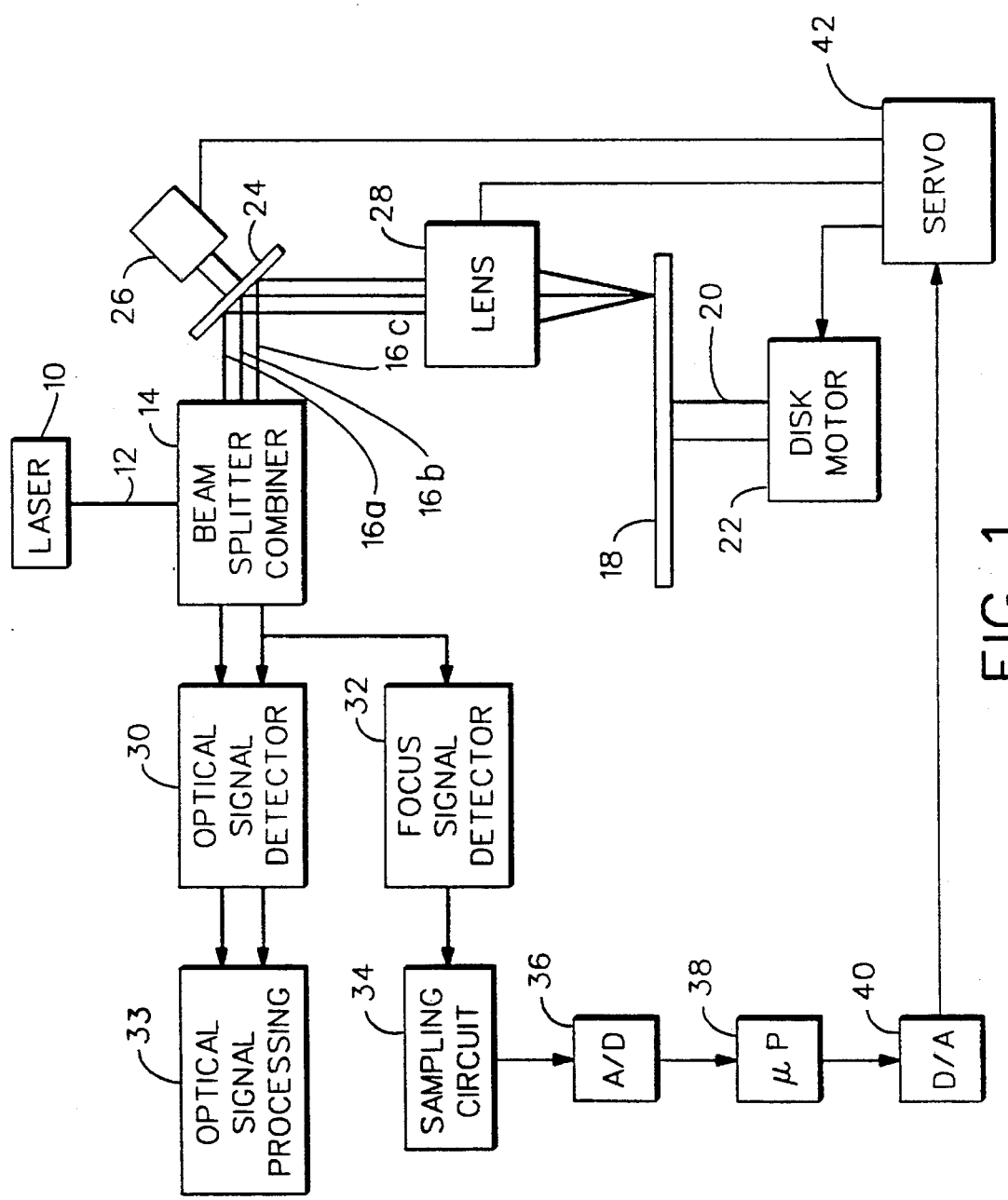
FIG. 1 is a schematic diagram of a preferred embodiment of an optical disk recording and reading system.

Referring to FIG. 1, the basic portions of an optical recording and reading system is illustrated. The data to be recorded is first applied to recording circuitry (not shown) which encodes the applied data. The encoded data from the recording circuitry is applied to a laser optical system which includes a laser 10. The laser 10 generates at least one laser beam 12 that is split by one or more beam splitters 14 to generate three laser beams 16a, 16b and 16c that are focused at spaced locations along the central line of the same selected track of a preformatted optical disk 18 supported on precision spindle 20. The disk 18 is preferably rotated by a motor 22.

The laser beams 16a, 16b and 16c are reflected by a mirror 24 attached to a mover 26 and is movable thereby to appropriately deflect the light as necessary to provide for the desired positioning of the light beams relative to the disk 18. After reflection from the mirror 24 the laser beams 16a–c are directed to an objective lens assembly 28 which directs the beams to the predetermined locations on the disk 18.

Laser beam 16a is a writing beam that is modulated by the encoded data to form optically detectable changes in a selected track of optical disk 18 representative of the encoded data. Laser beams 16b and 16c are reading beams. The read beams 16b, 16c are reflected from the disk 18 back to the lens 28, mirror 24 and beam splitter 14 which directs the reflected beams to an optical signal detector 30 with one beam being coupled to a focus signal detector 32. The optical signal detector 30 generates a plurality of detection signals that are applied to an optical signal processing circuit 33. The focus signal detector 32 delivers a focus error signal to a sampling circuit 34, such as a sample and hold circuit, that is indicative of the focus of the beam on the disk 18. Focus is a measure of the distance between the lens 28 and the disk 18, or more accurately, focus is a measure of whether the light beam converges at the disk surface. The beam is out of focus if it converges before it reaches the disk surface or if it would converge at a point below the disk surface. Out of focus conditions deteriorate the reading and writing capabilities of the beam. Thus, the focus signal detector 32 provides an analog focus signal representative of the focus condition of the system.

The sampling circuit 34 samples the focus signal from the focus detector 32 at a preselected sampling rate and provides an analog sampled signal to an analog-to-digital convertor 36. The analog-to-digital convertor 36 converts the analog focused signal sample to a digital representation suitable for digital processing. The digitized signal from the A/D convertor 36 is input to a computer such as microprocessor 38. The microprocessor 38 operates on the signal and outputs a digital word to a digital-to-analog convertor 40. The D/A convertor 40 converts the digital word from the microprocessor 38 to an analog value. The analog signal from the digital-to-analog convertor 40 is input to a servomechanism 42.

The servo 42 preferably manipulates the lens 28 to affect the focus of the light beam. It is also possible to have the servo affect the mover 26 for changing the position of the mirror 24 which would change the deflection of the beam 16 and thus affect the light entering the lens 28. When the light entering the lens 28 is changed, the focus of the lens is also changed. Because a focus is somewhat a measure of the distance between the disk 18 and the lens 28, the focus may also be affected by having the servo 42 affect the vertical positioning of the disk motor 22 or the disk 18 to affect the focus.

While FIG. 1 illustrates an optical disk recording and writing system, the members of which are affected by the servo 42, the principles involved are equally applicable to other systems. For example, the sampling circuit 34, analog-to-digital convertor 36, microprocessor 38 and digital-to-analog convertor 40 comprise a digital filter. The digital filter compensates for transducers used in the system. The input to the compensator is a signal representative of the position of a given member and the output of the digital filter is a signal that controls the servo 42 that controls operation of the member. Thus, the digital compensator is part of a control system.

Typical compensator approaches tend to map analog solutions to the digital domain through various means. Methods which map compensating filters from s to z plane (matched pole-zero, digital PID design) typically place 1 pole and 1 zero in the z plane to maintain the stability of the closed loop system. These techniques result in equal numbers of poles and zeros in the compensator designs. Computationally, this strongly implies that calculation and output of the control effort are based on samples available at that time. In other words, the calculation time is assumed to be zero. Accordingly, conventional techniques try to minimize the calculation time. The following is an example:

$$\text{Given } C(z) = \frac{U(z)}{E(z)} = \frac{z+a}{z+b} = \frac{1+az^{-1}}{1+bz^{-1}}$$

Where $U(z)=z$ transform of the control effort sequence (output), and $E(z)=z$ transform of the input sequence. Converting to a difference equation for computation $$U(z)(1+bz^{-1})=E(z)(1+az^{-1}) \rightarrow u(n)+bu(n-1)=e(n)+ae(n-1)u(n)= e(n)+ae(n-1)bu(n-1) \qquad \text{equation (1)}$$

where $e(n)$=present input $e(n-1)$=input at previous sample instant $u(n)$=present output $u(n-1)$=output at previous sample instant a,b=constants The difference equation (1) can be interpreted as a method with the steps of obtaining the current input sample, adding constant a times the past input sample, and subtracting constant b times the past output sample. Notice that this algorithm asks for an output at the same time the current input sample is obtained. Since the computation is based on the present input sample and, particularly, computation time does not equal zero, the implementation of this algorithm is not strictly possible. The effect of this computation (or delay) time is shown in the step responses of FIG. 2 wherein there is undershoot and overshoot of the response signal prior to approaching the desired steady state level. One method of circumventing this effect is to design a compensator (difference equation) that does not require the current input sample (e(n)) for its output. If one proposes a compensator where the present input sample is not needed, then this implies that there exists at least one more pole than zero in the compensator. For this case a full sample period can be allocated to the acquisition and computation at the output with no effect on the system stability. An example compensator of this kind was built and will be referred to as the complex delay compensator.

Figure 3:
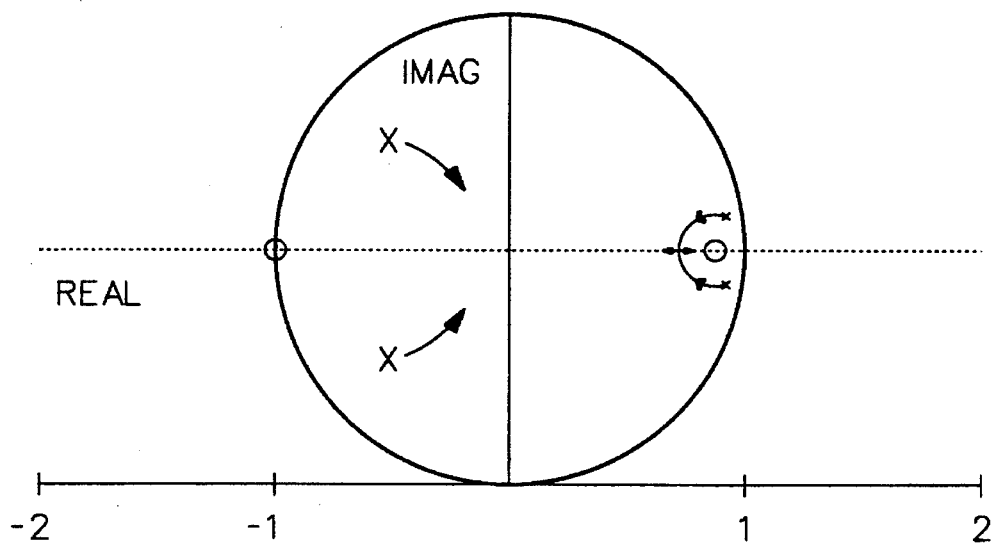
FIG. 3 is a z-plane root locus graph wherein poles encircle the compensator zero and approach the real axis and wherein the final locations of these poles determine the system rise time.

In the complex delay compensator, the zero is placed to attract the motor poles and provide cancellation of the slow pole at full gain. The complex poles are placed to approach the origin at full gain. When the complex poles reach the real axis, one goes left (high $\omega_n$), one goes right (decreasing $\omega_n$). The motor poles encircle the compensator zero and approach the real axis. One goes right (very low $\omega_n$) and should get cancelled by the compensator zero, one goes left and approaches the right going compensating pole. The final locations of these poles determine the system rise time (FIG. 3).

FIG. 2 shows that even moderate delays in the conventional digital PID compensator result in overshoot and long transient response time.

Figure 4:
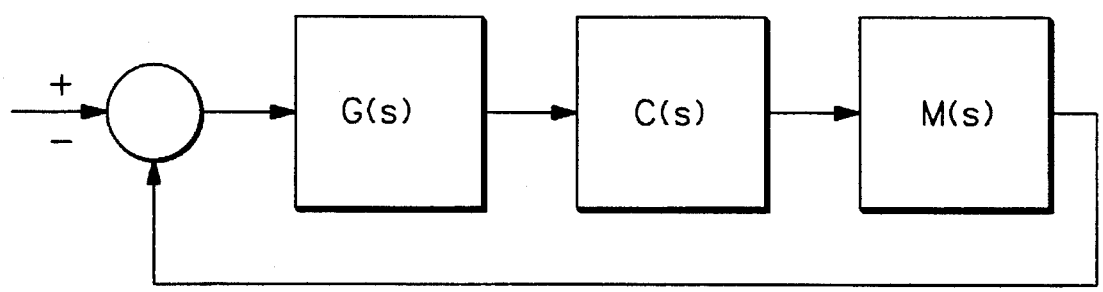
FIG. 4 is a block diagram simulating a focus servo for an optical disk drive.

Referring to FIG. 4, the following example will illustrate the performance differences between conventionally designed compensators and the complex delay compensator of the present invention. It is an example of what a focus servo could look like. In a continuous case, G(s) is the gain of the split cell, C(s) is a compensator design, and M(s) is the transfer function of the motor. In the sample case, the focus error signal is obtained using what is known as a split-cell. In the digital case, the split-cell again is going to be digitized, and mathematically that can be shown as a sample. The effect of the compensator design is to enhance the motor transfer function. For example, in this motor transfer function, if a stepped input is applied the motor position would settle on the order of 2 milliseconds and it would have an overshoot of nearly 40%. By adding the compensator and some gain, the settling time is reduced from two milliseconds down to on the order of 400 microseconds, and the overshoot can be brought down from on the order of 40% to about 10% to 20%.

The conventional digital PID compensator was designed using standard techniques and yields a compensator of the form:

$$D(z) = \frac{V(z)}{E(z)} = \frac{9.82 - 7.78z - 1}{1} ;$$

$$u(n) = 9.82e(n) - 7.78e(n-1)$$

The complex delay compensator of the present invention was designed directly in the z-plane. The poles and zero of this compensator were placed to provide good transient response. The design is of the form:

$$D(z) = \frac{16.34z^{-1} - 14.706z^{-2}}{1 + z^{-1} + 0.5z^{-2}}$$

$$u(n) = 16.34e(n-1) - 14.706e(n-2) - u(n-1) - 0.5u(n-2)$$

Figure 5:
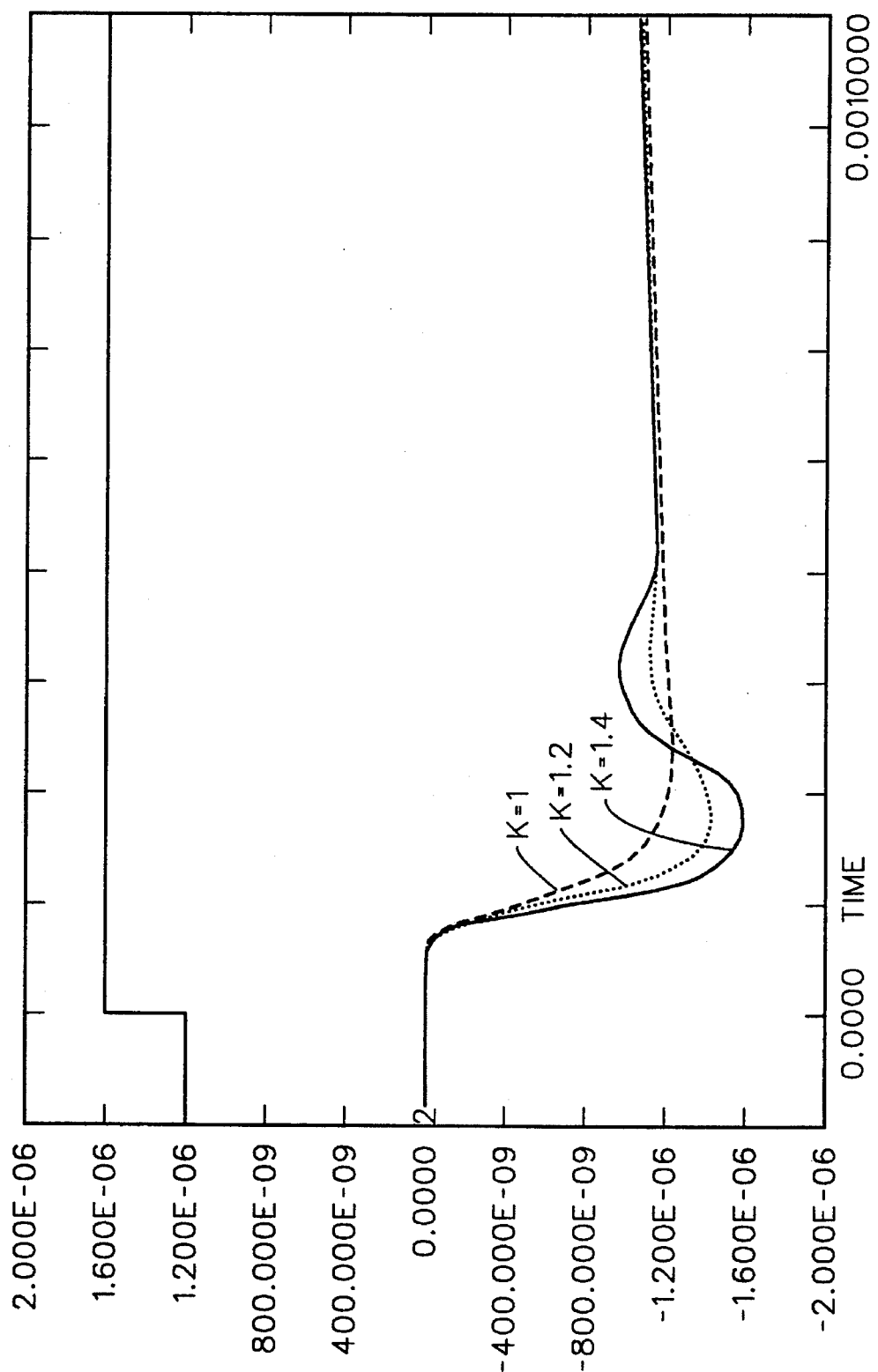
FIG. 5 graphically illustrates the transient response at nominal gain for the complex delay compensator.
Figure 6:
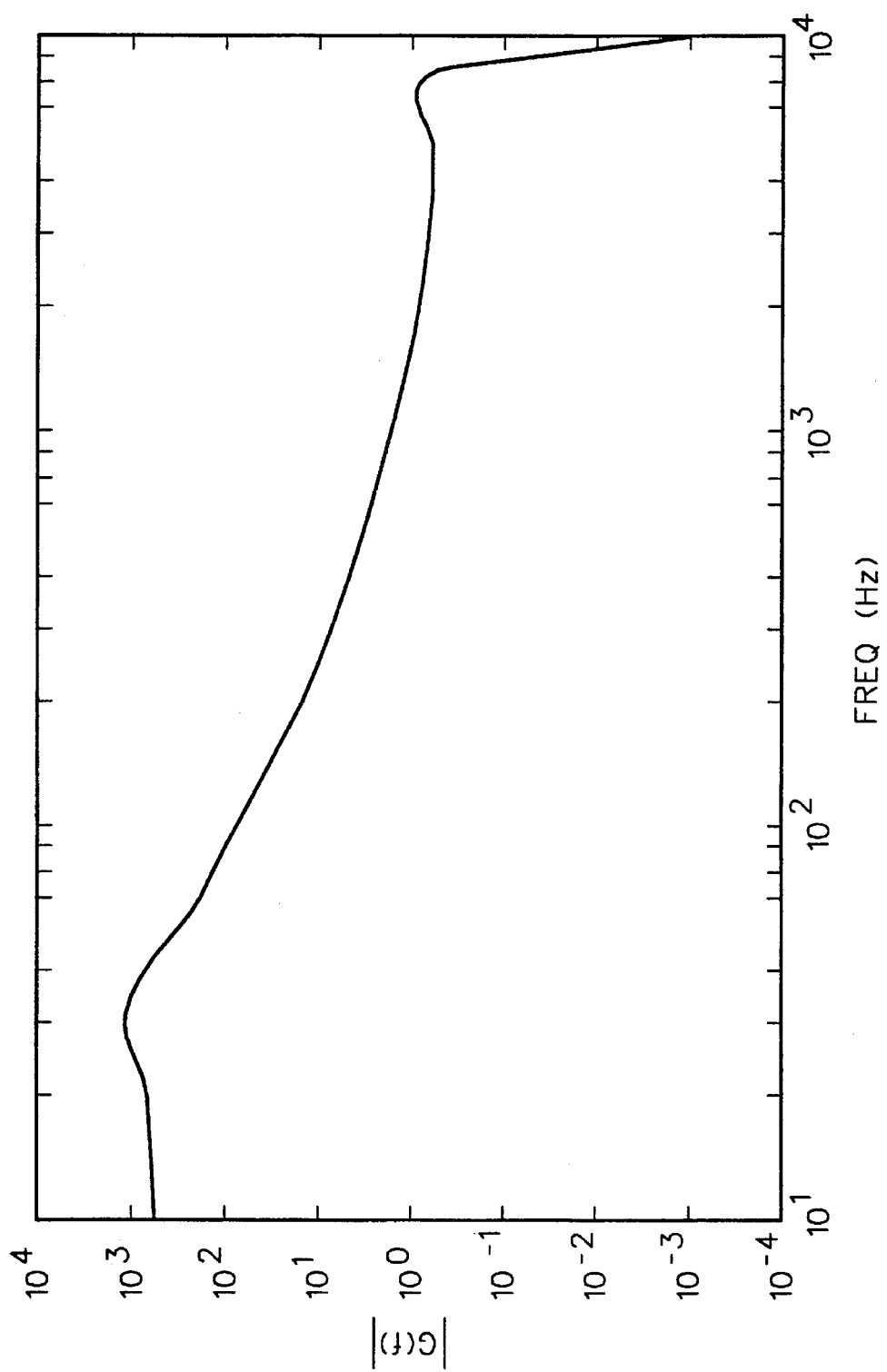
FIG. 6 graphically illustrates the positional disturbance rejection for the complex delay compensator.
Figure 7:
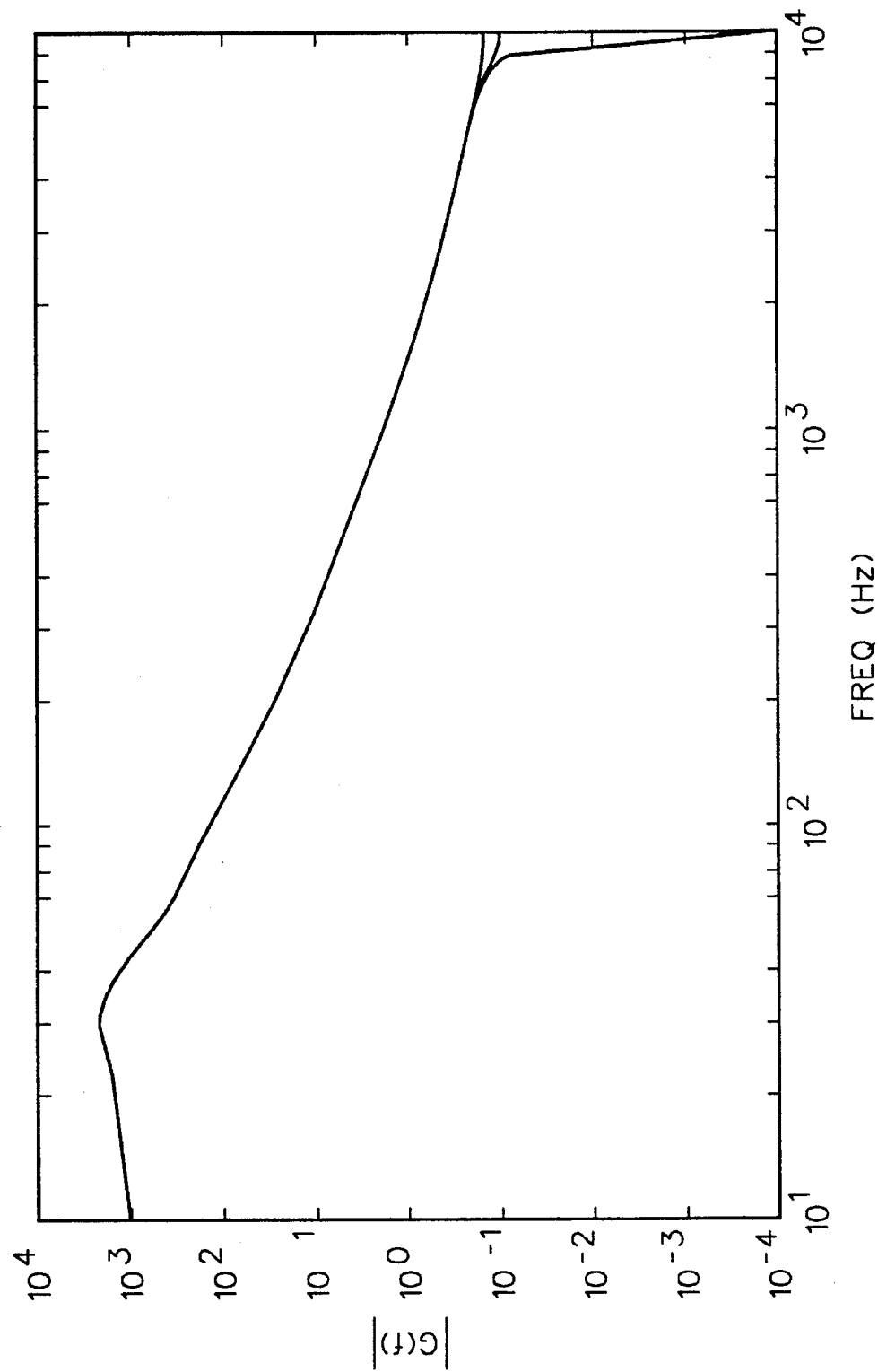
FIG. 7 graphically illustrates the positional disturbance rejection for a conventional digital PID compensator.

In addition to the transient response comparison of FIGS. 2 and 5, the disturbance rejection capability of each compensator design was simulated. FIGS. 6 and 7 show |G(s)|, the open loop magnitude response of each design. The position disturbance rejection of each case is defined as (1+|G(s)|). Note that this expression is approximately |G(s)| for frequencies below the bandwidth of the servo.

The complex delay compensator can be designed to be immune to delay times incurred through signal acquisition and computation. This allows inexpensive processors and D/A, A/D hardware to be used to implement high performance control designs.

The invention relates to designing digital control algorithms that do not require the present input sample for the present output sample. The motivation for this approach and a design example of this technique have been described.

A digital compensator is designed according to the present invention specifically for a 1 sample period delay time. In the example, the sample period is 50 μs which is a reasonable value for a focus servo in an optical disk drive. This delay compensator was chosen for its system response and results in a very well behaved system. Remember, this delay compensator design implies that a full 50 μs are available for acquire and computation. In contrast, the conventional compensator design would require that acquire and computation be less than ⅕ of this time or less than 10 μs.

It will now be appreciated that there has been presented a method for designing digital compensators that results in no degradation from computation and acquire times. Specifically, the invention is a design methodology that includes delay time in its design and results in compensator designs that do not use the present input sample in its calculation of the present output sample.

The novel concept of the present invention is waiting one full sample period before applying the correction that was calculated for the preceding sample. A feature of the present invention is waiting one full sample period before applying the correction that was calculated for the proceeding sample. The problem of waiting one sample period to output the computation is a major problem in terms of the response of the system. FIG. 2 shows the effect of delay time on the system response. In FIG. 2 the sampling period is 50 μs. It is seen that oscillatory behavior occurs with a conventional compensator design when the delay time approaches (or exceeds) ⅕ the sampling period. In the control systems, the sample period is almost universally taken to be one tenth the speed of response of the final servo. So, for example, if there is a servo with a 2 kilohertz bandwidth, the sample period is chosen to be 1 over 2 kilohertz divided by 10 yielding 50 microseconds. What this means is that, instead of calculating the output exactly at a time t equal to zero, calculate the output at t plus 50 microseconds. This allows a full sampling period (50 μs) to complete the input acquisition and output computation.

Referring to FIG. 5, at the nominal system gain (k=1), a well conditioned response occurs. Contract this with the conventional compensator of FIG. 2 where even a 10 μs delay in the output causes oscillatory response.

What is new and counter to conventional compensator design is understanding that there will be a delay in the output and designing the compensator to delay the output. What is done is to determine how long the output will be delayed, then calculate filter parameters based on the delay.

If the disk speed increases or decreases, the sample time may vary. If samples come faster, for instance, that could present E problems to a conventional compensator because the delay time (which will be fixed due to fixed computation and acquire time) will be constant but the sample period will decrease. This increases the ratio of delay time to sample period and results in oscillatory behavior. Assuming that the servo can sample at a different rate, the design of the compensator remains the same. Because the new compensator is designed to delay the output by 1 sample period without response degradation, the ratio of delay to sample period remains the same. Therefore system response does not change.

While the invention has been described with particular reference to a preferred embodiment, it will be understood by those skilled in the art that various changes may be made and equivalents may be substituted for elements of the preferred embodiment without departing from invention. And while the invention bas been described with reference to a particular optical disk system, it can be used equally well with other systems. In addition, many modifications may be made to adapt a particular situation and material to a teaching of the invention without departing from the essential teachings of the present invention. For example, some extensions of this technique include multiple sample period delay compensators that would allow greater than one sample period for the acquire and computation phase, and fractional sample period delay compensators that would allow the output of the compensator to occur between sample instants.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A digital compensator for controlling a servo to correct the value of a given parameter of a system, said digital compensator comprising:

means for sampling a signal representative of the instantaneous value of said given parameter;

means for acquiring an input sample of said signal during a first sample period;

means for computing a corrected output based on said input sample; and means for delivering after a predetermined delay said corrected output to said servo to correct the value of said parameter, wherein said predetermined delay is selected such that a total delay between a time at which said signal is sampled and a time at which said corrected output is delivered to said servo is at least equal to a sum of require sample acquisition and corrected output computation times;

and further wherein the means for sampling, means for acquiring, means for computing and means for delivering provide the compensator with a transfer function in which the number of poles is at least one greater than the number of zeros.

2. A digital compensator according to claim 1, wherein said means for delivering said corrected output after a predetermined delay delivers said corrected output to said servo during a second sample period immediately following said first sample period.

3. A digital compensator according to claim 1, wherein said given parameter is the focus of an optical disc drive.

4. A digital compensator according to claim 1, wherein said compensator is a fractional sample period delay compensator, and said means for delivering said corrected output after a predetermined delay delivers said corrected output to said servo during said first sample period.

5. A digital compensator according to claim 1, wherein said compensator is a multiple sample period delay compensator, and said means for delivering said corrected output after a predetermined delay delivers said corrected output to said servo during a subsequent sample period which does not immediately follow the first sample period.

6. An optical disk drive comprising:

a servo operative to correct the value of a given parameter of said optical disk drive;

means for sampling a signal representative of the value of said given parameter of said optical disk drive;

means for acquiring an input sample of said signal during a first sample period;

means for computing a corrected output based on said input sample; and means for delivering during a subsequent sample period said corrected output to said servo to correct the value of said parameter of said optical disk drive;

wherein the means for sampling, means for acquiring, means for computing and means for delivering provide a compensator having a transfer function in which the number of poles is at least one greater than the number of zeros.

7. A digital compensator according to claim 6, wherein said corrected output is delivered to said servo during a second sample period immediately following said first sample period.

8. A method for operating a digital compensator for controlling a servo to correct the value of a given parameter of a system, said method comprising the steps of:

sampling a signal representative of the instantaneous value of said given parameter;

acquiring an input sample of said signal during a first sample period;

computing a corrected output based on the sample; and delivering after a predetermined delay said corrected output to said servo to correct the value of said given parameter, wherein said predetermined delay is selected such that a total delay between a time at which said signal is sampled and a time at which said corrected output is delivered to said servo is at least equal to a sum of required sample acquisition and corrected output computation times;

and further wherein the steps of sampling, acquiring, computing and delivering provide the compensator with a transfer function in which the number of poles is at least one greater than the number of zeros.

9. A method according to claim 8, wherein the step of delivering said corrected output after a predetermined delay includes delivering said corrected output to said servo during a second sample period immediately following said first sample period.

10. A method according to claim 8 wherein said given parameter is the focus of an optical disk drive.

11. A method according to claim 8, wherein said compensator is a fractional sample period delay compensator, and said step of delivering said corrected output after a predetermined delay includes delivering said corrected output to said servo during said first sample period.

12. A method according to claim 8, wherein said compensator is a multiple sample period delay compensator, and said step of delivering said corrected output after a predetermined delay includes delivering said corrected output to said servo during a subsequent sample period which does not immediately follow the first sample period.

13. A digital compensator for controlling a servo to correct the value of a given parameter of a system, said digital compensator comprising:

a sampling circuit, connected to a source of said given parameter, which samples a signal representative of the instantaneous value of said given parameter;

an analog-to-digital converter, connected to said sampling circuit, which acquires during a first sample period an input sample of said signal;

a computer, connected to the analog-to-digital converter, which uses said input sample to compute a corrected output; and a digital-to-analog converter, connected to said computer, which delivers said corrected output to said servo during a subsequent sample period to correct said value of said given parameter;

wherein the compensator has a transfer function in which the number of poles is at least one greater than the number of zeros.

14. A digital compensator according to claim 13, wherein said corrected output is delivered to said servo during a second sample period immediately following said first sample period.

15. A digital compensator according to claim 13, wherein said compensator is a multiple sample period delay compensator, and said corrected output is delivered to said servo during a subsequent sample period not immediately following the first sample period.

* * * * *